INVENTOR.
LUDGER E. LA BRIE
BY H. Q. Clayton
ATTORNEY

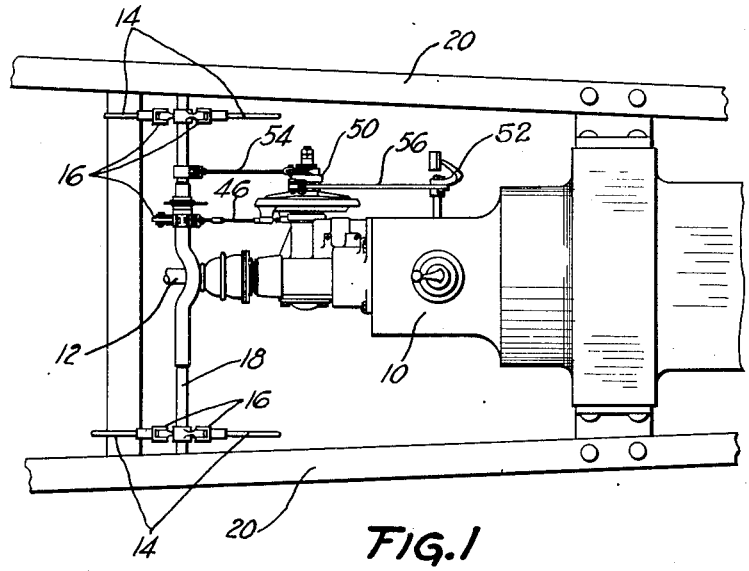
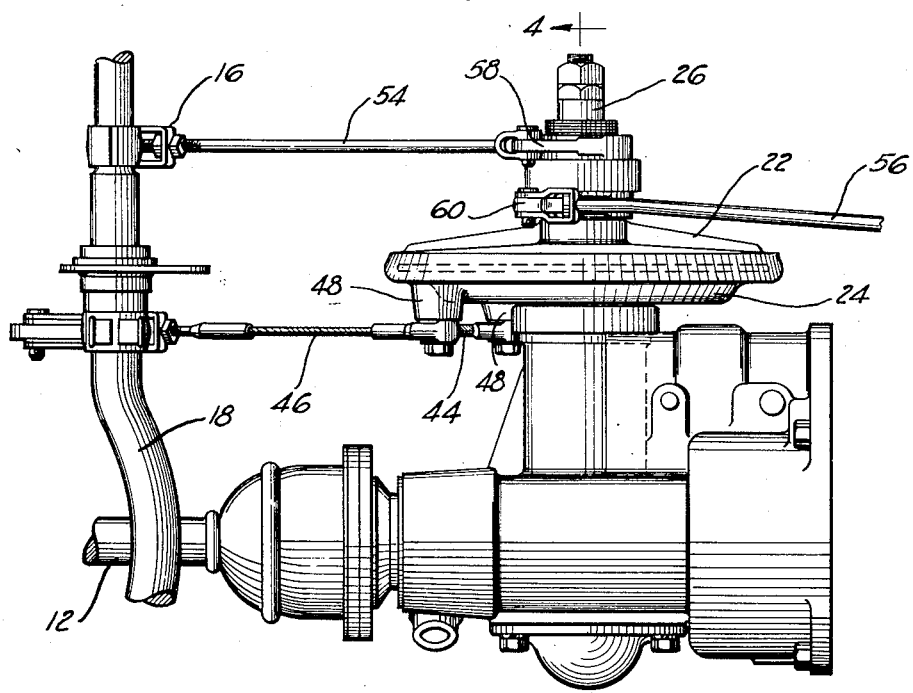

Feb. 23, 1937. L. E. LA BRIE 2,071,636
BRAKE
Filed Jan. 30, 1933 3 Sheets-Sheet 3

INVENTOR.
LUDGER E. LA BRIE
BY H. Q. Clayton
ATTORNEY

Patented Feb. 23, 1937

2,071,636

UNITED STATES PATENT OFFICE 2,071,636

BRAKE

Ludger E. La Brie, South Bend, Ind., assignor to Bendix Aviation Corporation, South Bend, Ind., a corporation of Delaware Application January 30, 1933, Serial No. 654,314

5 Claims. (Cl. 188—140)

This invention relates in general to power mechanism for operating the brakes of an automotive vehicle, and more particularly to a power mechanism of the so-called mechanical servo type wherein a driver controlled servo or "booster brake" operated by the drive shaft of the vehicle serves to apply the conventional wheel brake.

It is the principal object of the invention to provide a rugged compact and with all efficient brake of this type, one that is uniform in its action and easily controlled by the driver. Heretofore in the development of the mechanical servo type of power brake great difficulty has been experienced in providing a controllable brake.

To the above end there is suggested a mechanism providing what is known in this art as a "follow-up" control wherein the position of the brake pedal, as it is moved toward the floorboard, determines the degree of application of the brakes.

It is also an object of the invention to provide a connection between the brake pedal and the brake rigging, said connection to incorporate the means for controlling the servo unit and so constructed that there is provided a direct and positive connection with the rigging whereby the brakes may be applied either solely by the manual effort of the driver or by said manual effort acting concurrently with the application of the brakes by power.

It is a further object of the invention to so construct and arrange the connection between the brake pedal and the brake rigging that the slack in the system is taken up to bring the brake shoes against the drum before the power means is activated to apply the brakes by power. Such a construction makes for a very effective control of the power means and also permits of the use of the mechanism as a parking brake, thus supplementing the usual hand operated so-called emergency brake.

A further object of the invention is to provide a mechanical servo brake mechanism operable irrespective of the direction of movement of the vehicle, that is operable to apply the brakes when the vehicle is moving either forward or backward.

Yet another object is to provide a power mechanism of the aforementioned type wherein the control means, said means being comparable to the control valve of a vacuum operated power brake mechanism, comprises two relatively movable major elements, one secured to the brake pedal and the other to the brake rigging, the relative movement of said major elements serving to operate the control means to control the power output of the servo unit, the two elements together constituting a force transmitting unit in the connection between the pedal and brakes to apply the brakes by the physical effort of the driver as explained above.

Other objects and advantages of the invention will be apparent from the following description taken in connection with the disclosure in the accompanying drawings, in which:

Figure 1 is a plan view of the mechanical servo mechanism constituting the invention, showing it in operative relation to the transmission and brake operating mechanism of the vehicle;

Figure 2 is an enlarged fragmentary view of the servo mechanism of Figure 1;

Figure 3:
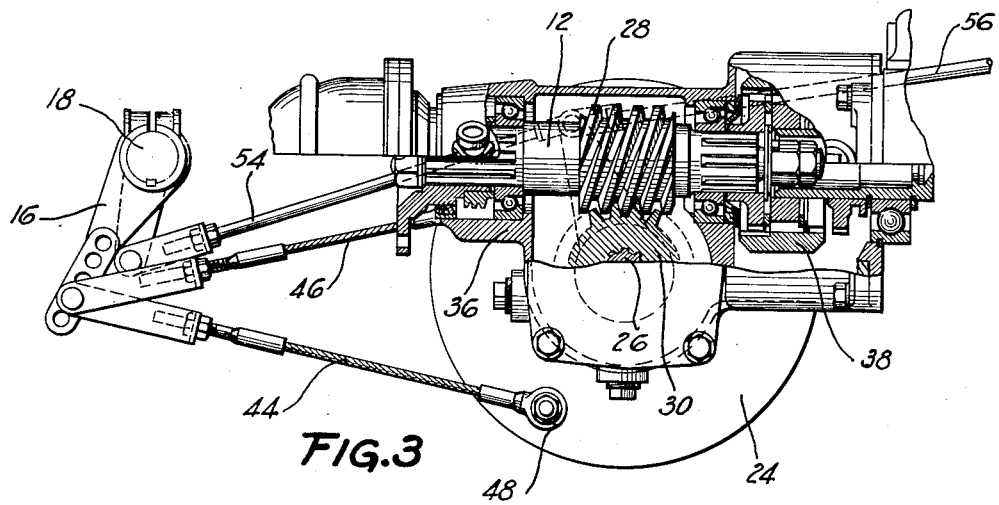
Figure 3 is a side elevation of the power mechanism, a portion of the same being broken away to show the parts in vertical longitudinal section.

Referring to Figure 1 of the drawings, numeral 10 indicates the usual change-speed transmission casing of an automobile with a drive shaft 12 extending rearwardly therefrom. The four wheel brakes to be operated are connected to a set of conventional brake operating rods 14, the latter being connected to crank arms 16 mounted on a cross shaft 18, the latter journalled in frame members 20.

The power unit, which may be termed a "mechanical servo" or "booster unit", comprises rotor and stator disc elements 22 and 24, the former slidably keyed to a jack shaft 26 on splines 27 extending transversely from the drive shaft 12 and drivably connected thereto by means of worm and worm wheel members 28 and 30. The gear reduction is preferably approximately ten to one to thereby reduce the rubbing speed of the servo unit and avoid the creation of an excess of heat during the operation of applying the brakes. The servo mechanism is also much more controllable by virtue of the step-down speed of the rotor unit, making unnecessary a finely regulated application of pedal pressure in operating the servo unit.

The stator part 24 of the servo unit is provided with a sleeve 32 rotatably mounted on the jack shaft 26 and housed within a projection 34 extending laterally from a casing 36, the latter housing the reduction gears 28 and 30. A conventional free wheel unit or one-way clutch 38 is interposed in the driving connection, providing a means for increasing the efficiency of the servo unit when the speed of the vehicle is relatively low by cutting out the braking effect of the engine. The stator member 24 is spaced from the sleeve 34 by an antifriction bearing 40 and the rotor and stator members are normally spaced apart by a spring 42, sleeved over the jack shaft. The spring 42 is purposely made sufficiently strong so that the same is not collapsed until after the brake shoes of the wheel brakes have contacted the brake drums. The stator member is operably connected to one of the crank arms 16 on the cross shaft 18 by alternately operable flexible cables 44 and 46 connected to substantially diametrically spaced bosses 48 on the stator member, thus providing means for operating the wheel brakes irrespective of the direction of rotation of the stator member.

The servo unit is adapted to be controlled by a control unit 50 incorporated in the connection between a brake pedal 52 and the cross shaft, said connection comprising links 54 and 56 and the unit 50. This control unit and its interconnection with the brakes and pedal constitute the essence of the invention.

The control unit preferably comprises two relatively movable crank members 58 and 60 connected respectively to the links 54 and 56. Hub portions 62 of the cranks are rotatably mounted on the end of the jack shaft and are each provided in their opposed inside faces with a plurality, preferably three, equally spaced conical indentations 64. Antifriction ball members 66 are seated in said indentations and function as thrust members to force the cranks to and from each other laterally when the cranks are relatively rotated. Antifriction means comprising ball races 68 and ball bearings 70 are seated within recesses in the outer faces of said hub portions, said means serving as thrust members, the inner of the races contacting the hub of the rotor member 22 and the outer of the races contacting a sleeve 72, the latter supporting cup washers 74. Nuts 76 and 78 serve to lock the assembly in position.

The operation of the servo mechanism is as follows:

When the brake pedal is depressed, the two cranks 58 and 60 move as a unit until the brake shoes have contacted the drum, this action being insured by making the spring 42 sufficiently strong, all as previously described. After the shoes have contacted the brake drum, further movement of the pedal serves to compress the cup washers 74, which are normally spaced apart as disclosed, to provide a slight delay in applying the brakes by power and also providing for a small amount of play in the pedal.

Further movement of the brake pedal serves to impart a simultaneous angular and translatory relative movement of the crank 60, the outer crank 58 remaining stationary, the movement of the crank 60 being effected by virtue of the wedging action between the balls 70 and the coned seats 64 in the crank hubs 62. The rotating rotor member 22 is thus moved into frictional engagement with a friction mat 80 on the stator member 24, and the frictional drag set up between the members imparts an angular movement to the stator member to apply the wheel brakes, the degree of application being a function of the quality of the friction surfaces of the servo unit and the degree of loading between the members of the servo unit effected through the medium of the control unit by the brake pedal.

Figure 4:
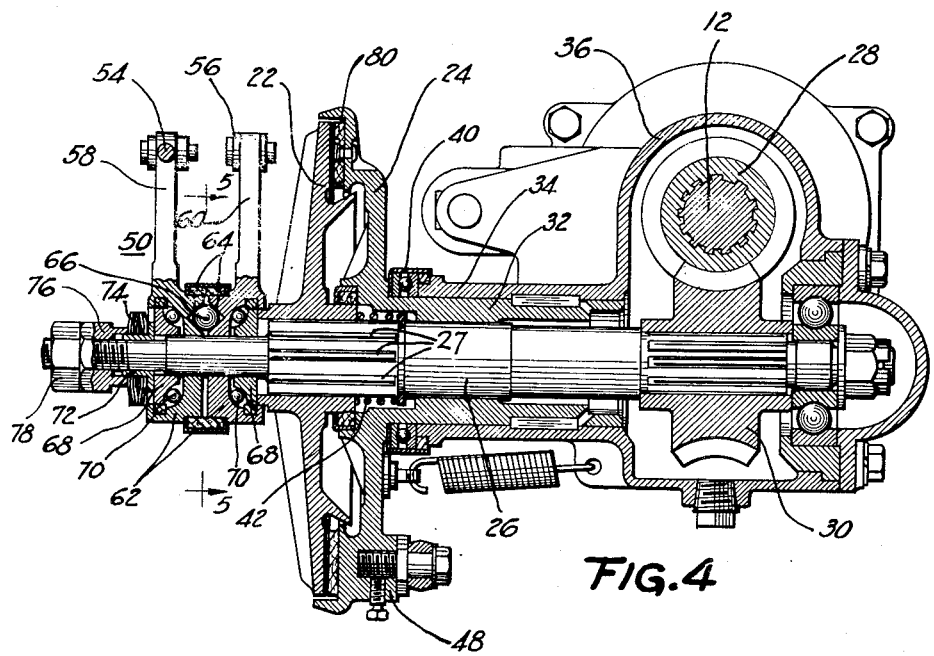
Figure 4 is a vertical transverse section taken on the line 4—4 of Figure 2, and looking in the direction of the arrows.

If the brake pedal is held partially applied, the crank arm 60 is held stationary and the crank arm 58 is rotated as the brakes are being applied, and this rotative movement provides what is known as a "follow-up" action, the crank 60 being moved to the left, Figure 4, by the spring 42 to release the load on the rotor member 22 until a state of equilibrium is reached in the brake system.

Further application of the brake pedal serves to repeat the above cycle and increase the application of the wheel brakes. The degree of application of the brakes is thus a function of the position of the brake pedal in its arc of throw.

It will also be noted that the brakes are applied by the physical effort of the driver concurrently with their application by power, the direct and positive connection between the pedal and brakes, via the link 56, cranks 58 and 60, balls 70 and link 54, insuring this result. This direct connection between the pedal and brakes provides a means for holding the brakes applied by the brake pedal when the vehicle is parked and also provides a means for applying the brakes should there be a failure of the servo unit. Likewise the connection provides a means for concurrently applying the brakes by power and by the physical effort of the driver should the power application prove inadequate.

Figure 6:
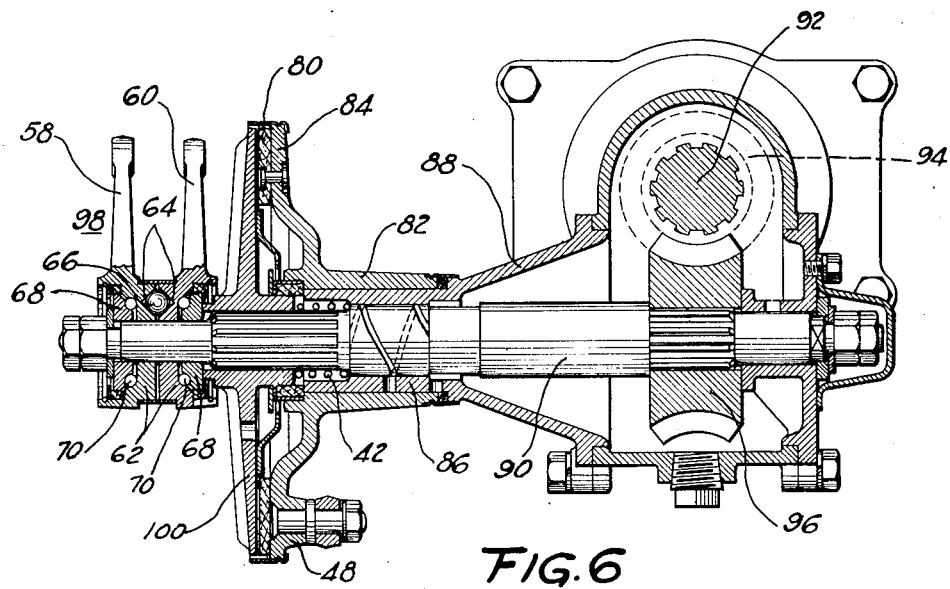
Figure 6 is a transverse sectional view, similar to Figure 4, disclosing a modified form of servo unit.
Figure 5:
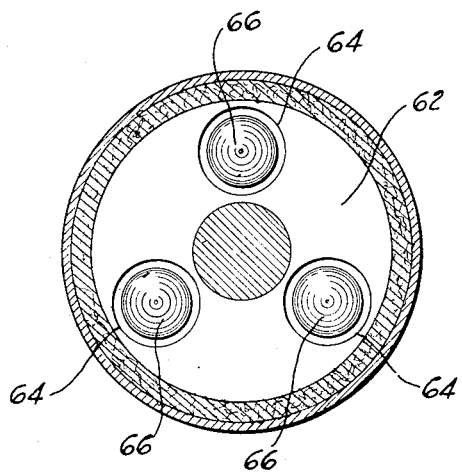
Figure 5 is a section taken on line 5—5 of Figure 4 disclosing in detail a portion of the control mechanism for the servo or power unit.

There is disclosed in Figure 6 a slightly modified form of unit wherein a sleeve portion 82 of a stator unit 84 is telescoped over a projection 86 extending from a housing 88, the projection housing a rotatable jack shaft 90 geared to a drive shaft 92 by worm and worm wheel members 94 and 96. A control unit 98 and rotor unit 100 are similar in all respects to the corresponding elements in the previously described embodiment of the invention.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In a vehicle having an engine, a power drive shaft, a brake system including front and rear brakes, manually operable means to control the brakes, servo mechanism controlled by said manually operable means to apply the brakes comprising an auxiliary shaft, speed reducing means between the auxiliary shaft and the drive shaft, friction elements carried by the auxiliary shaft and relatively movable axially and angularly, connecting means between one of the friction elements and the auxiliary shaft, connecting means between the other of the friction elements and the brakes, means operable by said manually operable means to urge said friction elements into contact, and means operable by said manually operable means to apply the brakes in the event of failure of the servo means.

2. In a vehicle having an engine, a power drive shaft, a brake system including front and rear brakes, manually operable means to control the brakes, servo mechanism controlled by said manually operable means to apply the brakes comprising an auxiliary shaft, reduction gears between the auxiliary shaft and the drive shaft, friction elements carried by the auxiliary shaft and relatively movable axially and angularly, connecting means between one of the friction elements and the auxiliary shaft, connecting means between the other of the friction elements and the brakes, a pair of coacting elements having adjacent flat surfaces carried by the auxiliary shaft, conical recesses carried by the coacting elements, a ball member partly received in each of two of said conical recesses, means connecting said coacting elements to said manually operable means, said manually operable means operating to apply the brakes manually in the event of failure of the servo means.

3. A servo brake mechanism for automotive vehicles having a drive shaft and a plurality of wheels, braking means associated with the wheels, means including a brake pedal to apply the brakes, and connecting means between the brake pedal and the braking means, said connecting means including a cross shaft, a jack shaft driven by the drive shaft, a rotatable disc splined to and axially movable on the jack shaft, a friction disc journalled on the jack shaft, connecting means between the friction disc and the cross shaft, yielding means urging said discs apart, means including balls engaged in conical recesses formed in the mating surfaces of cooperating members carried by the jack shaft interconnecting the brake pedal and the rotatable disc to urge the rotatable disc into engagement with the friction disc to apply the brakes by the power transmitted through the drive shaft, said interconnecting means also operating to apply the brakes manually in the event of failure of the servo means.

4. In an automotive vehicle having wheels, brakes carried by each wheel, a cross shaft, connecting means between the brakes and the cross shaft, manually operable means to rotate the cross shaft, a drive shaft, a jack shaft geared to the drive shaft, a rotatable disc splined to and slidable axially on the jack shaft, a friction disc journalled on the jack shaft, connecting means between the friction disc and the cross shaft operable to actuate the cross shaft upon rotation of the friction disc in either direction, yielding means urging the rotatable disc and the friction disc apart, and means including a manually operable pedal to urge the rotatable disc into contact with the friction disc.

5. An automotive vehicle having wheels, brakes carried by each wheel, a cross shaft, connecting means between the brakes and the cross shaft, a drive shaft, a jack shaft geared to the drive shaft, a rotatable disc splined to and slidable axially on the jack shaft, a friction disc journalled on the jack shaft, connecting means between the friction disc and the cross shaft operable to actuate the cross shaft upon rotation of the friction disc in either direction, yielding means urging the rotatable disc and the friction disc apart, means including a pair of lever arms having mating surfaces carried by the jack shaft and balls engaged in conical recesses formed in the mating surfaces of the lever arms to urge the rotatable disc into engagement with the friction disc, manually operable means to actuate one of said lever arms, and connecting means between the other of said lever arms and the cross shaft whereby the brakes may be manually applied when the drive shaft is not rotating.

LUDGER E. LA BRIE.